United States Patent [19]
Kabelitz et al.

[11] Patent Number: 5,114,320
[45] Date of Patent: May 19, 1992

[54] BLOWER OR PUMP WITH CAPILLARY FILTER FOR REPLENISHMENT OF OIL SEPARATED BY VACUUM PUMP

[75] Inventors: Hans-Peter Kabelitz; Martin Mühlhoff, both of Cologne; Hans Kriechel, Bornheim; Wolfgang Maas; Dieter-Martin Kolvenbach, both of Cologne, all of Fed. Rep. of Germany

[73] Assignee: Leybold AG, Hanau, Fed. Rep. of Germany

[21] Appl. No.: 630,530

[22] Filed: Dec. 20, 1990

[30] Foreign Application Priority Data

Dec. 27, 1989 [DE] Fed. Rep. of Germany ....... 3943113

[51] Int. Cl.$^5$ ............................................. F04B 17/00
[52] U.S. Cl. .............................. 417/423.13; 417/424.2; 415/121.2; 415/169.1; 184/6.23; 55/269; 55/466; 210/168; 210/416.5
[58] Field of Search ............. 415/110, 111, 112, 168.1, 415/169.1, 121.2; 417/423.12, 423.13, 424.2, 201; 418/47, DIG. 1; 55/269, 466, 437; 210/168, 194, 196, 197, 258, 416.1, 416.5; 184/6.23

[56] References Cited

U.S. PATENT DOCUMENTS

| | | |
|---|---|---|
| 4,674,952 | 6/1987 | Osterstrom . |
| 4,729,724 | 3/1988 | Henning et al. . |
| 4,764,086 | 8/1988 | Jesinger . |
| 4,963,076 | 10/1990 | Fleischmann et al. ......... 417/423.12 |

FOREIGN PATENT DOCUMENTS

| | | |
|---|---|---|
| 147015 | 5/1984 | European Pat. Off. . |
| 235392 | 12/1986 | European Pat. Off. . |
| 3032967 | 9/1980 | Fed. Rep. of Germany . |
| 1235057 | 5/1960 | France ............................ 417/423.12 |
| 0244892 | 10/1986 | Japan ............................. 418/DIG. 1 |
| 1-30093 | 5/1989 | Japan . |
| 5814589 | 5/1989 | Japan . |
| 0240787 | 9/1989 | Japan ............................. 418/DIG. 1 |
| 0091490 | 3/1990 | Japan ............................. 418/DIG. 1 |
| 0091493 | 3/1990 | Japan ............................. 418/DIG. 1 |
| 2181186 | 4/1981 | United Kingdom . |

Primary Examiner—Edward K. Look
Assistant Examiner—Christopher M. Verdier
Attorney, Agent, or Firm—Felfe & Lynch

[57] ABSTRACT

A housing 3 disposed below the rotor accommodates a driving motor 13, shaft bearings 14, 15 and an oil sump 21. An evacuating line 31 which traverses the wall the housing 3 connects a vacuum pump to the interior 18 of the housing. In order to avoid the loss of oil in the housing or the bearings, the evacuating line 31 and the oil sump 21 are directly connected.

13 Claims, 1 Drawing Sheet 5,114,320

BLOWER OR PUMP WITH CAPILLARY FILTER FOR REPLENISHMENT OF OIL SEPARATED BY VACUUM PUMP

BACKGROUND OF THE INVENTION

The invention relates to a blower or a pump having a rotor and rotor shaft which is essentially vertically disposed during operation. A housing disposed underneath the rotor and accommodates a driving motor, shaft bearings, and an oil sump. An evacuating line traverses the wall of the housing to connect a vacuum pump to the interior of this housing.

When pumps or blowers of this kind are in action, oil is atomized in the interior of the housing for the motor and bearings. This occurs inside the bearings and at inside walls of the housing if there are spinner disks. There is hence the risk of oil vapors escaping via the shaft bearing into the area of the rotor. This risk is particularly high when there is a great oil atomization caused by high rotational speeds, and when there is a low pressure in the area of the rotor. Examples include radial-flow turbo blowers for circulating gases in gas lasers and turbo molecular pumps.

In order to prevent oil vapors from entering the rotor side through the shaft bearing, it is known the connect the interior of the motor and bearing housing to a vacuum pump. If the pressure inside the housing is then maintained at a lower level, the oil vapors can no longer reach the rotor side. In this accomplishment, the vacuum pump connected to the motor and bearing housing removes the oil vapors caused by atomization by suction. In the long run, this leads to an oil loss in the motor and bearing housing.

SUMMARY OF THE INVENTION

It is an object of the present invention to provide a blower or pump of the aforesaid kind where any oil loss caused by evacuation of the motor and bearing housing is largely avoided.

This object is accomplished by directly connecting the evacuating line and oil sump to each other. A major portion of the oil contained in the gases that were removed by suction and are present in the evacuating line precipitates at the preferably cooled internal walls. Via the line segment which directly connects the evacuating line to the oil sump, this oil can hence flow back into the oil sump. Therefore, there is no risk of a rapidly occurring lack of oil caused by an evacuation of the motor housing which could thus lead to damage.

It is particularly advantageous to incorporate a filter material, e.g. polyethylene (trade name: "Poroplast"), in the line segment joining the evacuating line directly to the oil sump. A capillary filter element having these properties first absorbs the oil that is generated. Upon saturation, the oil, due to the geodetic height, drops off into the oil sump. Such a filter element prevents the direct pressure equalization between the pressure in the oil sump and the slightly lower pressure at the outlet of the evacuating line. The pressure conditions present make sure that no oil absorbed in the filtering material recirculates. The filtering material prevents oil or oil foam from the oil sump entering the evacuating line. This is due to the fact that the selected filtering material has a very low gas conductance.

DETAILED DESCRIPTION OF THE PREFERRED EMBODIMENT

Figure 1:
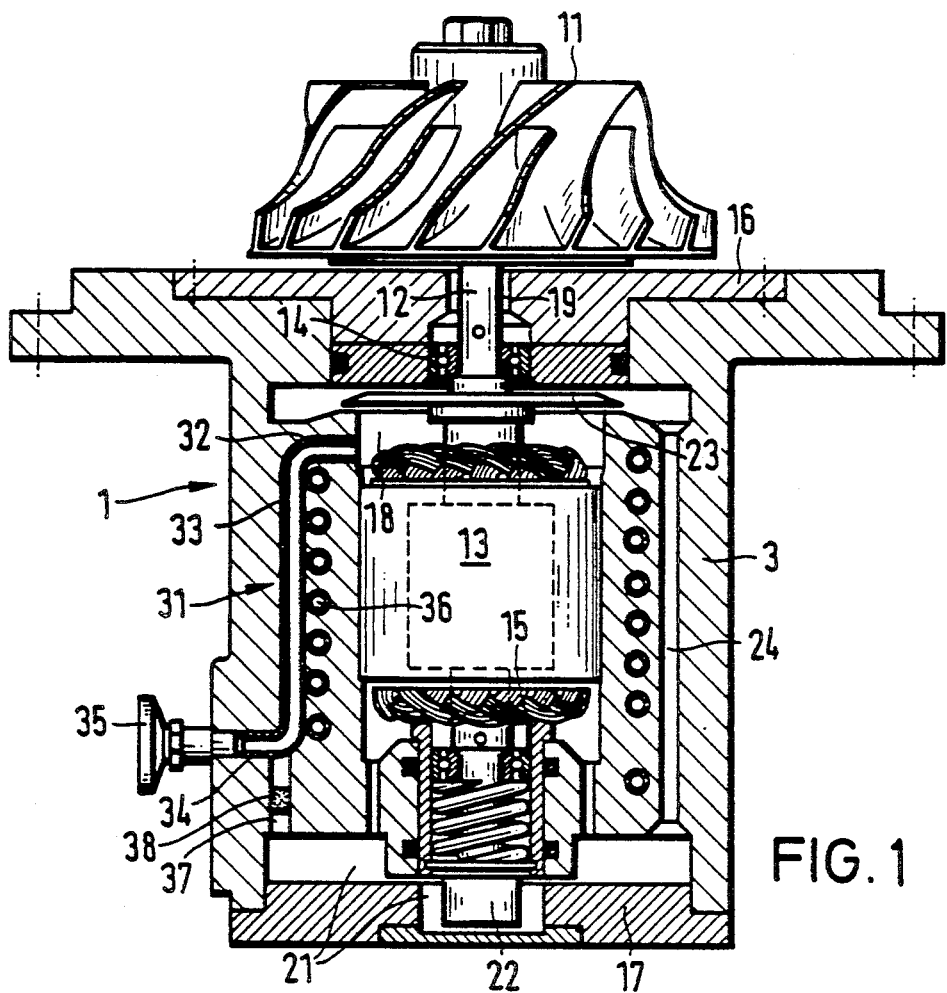
FIG. 1 is a section of the motor and bearing housing of a radial-flow turboblower and FIG. 2 is partial view of further details of FIG. 1.

FIG. 1 is a partial representation of a radial-flow turboblower 1 (essentially missing is the flow casing) including the motor or bearing housing 3. The rotating unit supported in this housing includes the blower rotor 11, the shaft 12 and the anchor 13 of the motor. For the bearing of the shaft 12, there are roller bearings 14 and 15 one of which (14) is disposed between the blower rotor 11 and the motor anchor whereas the second bearing 15 is disposed in the area of the free end of the shaft 12 facing away from the blower rotor 11.

The front connection of the housing 3 is formed by flange-like covers 16 and 17 so that the interior of the housing 18 is covered up to the passage 19 of the shaft in the upper cover 16. The lower cover seals the oil sump 21. An oil pump 22 disposed in the area of the free end of the shaft 12 extends into this oil sump. Via a central, non-represented duct in the shaft 12, this pump supplies oil to the bearings 14 and 15. Below the upper bearing 14, there is a spinner disk 23 mounted to the shaft 12. This spinner disk prevents oil which escapes form the bearing 14 from traversing the motor 13. Via vertical ducts 24 in the wall of the housing 3, the spun off oil is reintroduced into the oil sump 21.

When a radial-flow turboblower of this kind is in operation, oil is atomized and micro droplets are formed. An evacuating line 31 is provided to prevent gases carrying oil vapors from reaching the area of the rotor 11 via shaft passage 19. This evacuating line has an inlet segment 32 connected to the inner chamber 18 in the upper area of housing 3. It is followed by a center segment 33 which extends essentially vertically across the wall of housing 3. The outlet segment 34 following the center segment 33 extends out of the lower area of the housing 3. It ends in a small flange 35 to which a vacuum pump is connected while the blower 1 is in operation.

The cylindrical portion of the housing 3 is manufactured by means of casting. The evacuating line 31 is preferably a small pipe made of noble metal and incorporated into the wall of housing 3 by means of casting. Also included by casting is the cooling element 36 through which a coolant flows during operation of blower I. In order to achieve an effective cooling of the evacuating line 31, the individual loops of the cooling element 36 are bonded, preferably by means of welding, to the pipe forming the evacuating line.

Outlet segment 34 of the evacuating line 31 is directly connected to the oil sump 21 (an indirect connection is established via the evacuating line 33, the interior 18 and, for example, the oil refeeding ducts 24). This direct connection is established via a vertical bore in the wall of housing 3 which forms segment 37 joining the evacuating line 31 to the oil sump 21. Inside this line segment 37, there is a filtering element 38. The essential task thereof is to prevent oil or oil foam from the oil sump from reaching the evacuating line 31.

Figure 2:
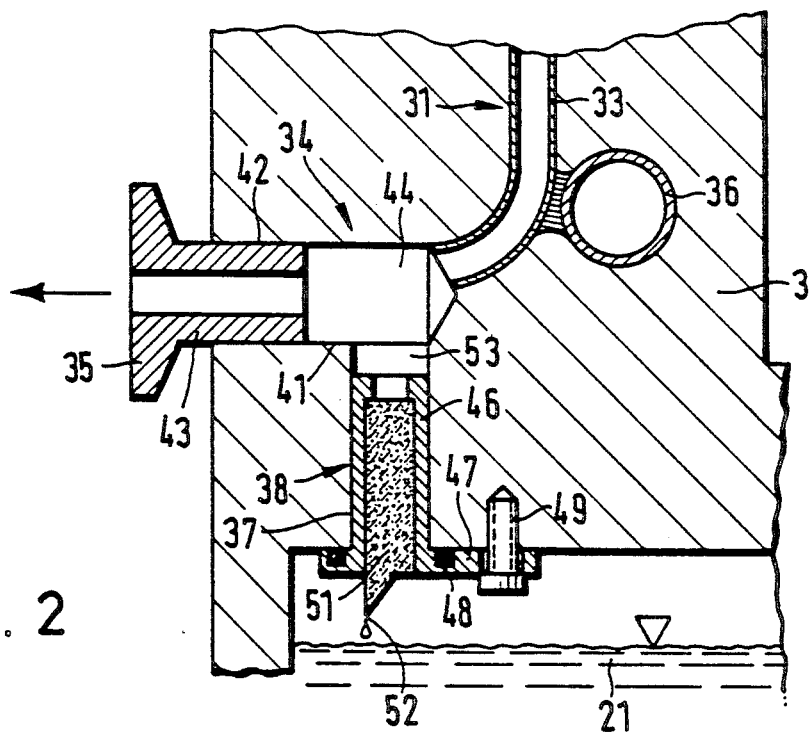

As seen in FIG. 2, a portion 41 of the outlet segment 34 has an enlarged cross section. The outlet segment 34 is formed by an essentially horizontal bore 42 in the wall of housing 3. The cross section thereof is enlarged as compared to the remaining segments of the evacuating line 31. A connecting piece 43 of the small flange is inserted into this bore 42 thus creating a chamber 44 where the speed of the flowing gas is substantially reduced by the cross section. Oil that is pulled along by the gas flow is retained in chamber 44 and is collected on the bottom thereof. Drain line 37, which leads to the oil sump 21 and contains the filter element 38, ends in this area.

The filter element 38 is configured as a filter cartridge having a sleeve 46 with a flange or collar 47 which is fixed to the housing 3 on the side of the oil sump 21 by means of a screw 49 and retains a seal 48. Inside the sleeve 46 there is the filter material 51 which is advantageously made of polyethylene (trade name "Poroplast"). A capillary element of this kind is able to absorb oil and release it upon saturation. The dropping off is supported by a drip edge 52 having a tapered end. Also, it is possible that the filter material 51 extends slightly through the surface of the oil level into the oil sump. In this case, the oil absorbed by the filter element at the top is constantly discharged.

The oil filter element 38 is configured and inserted into drain line 37 such that the top portion of the drain line 37 is free thus forming an oil collector chamber 53. Larger amounts of oil accumulating for a short period of time are collected in chambers 44 and 53 so that none reaches the bore in the small flange and, hence, the vacuum pump connected thereto.

During operation, the gases carrying oil vapors emerge from the interior of the housing 18 into the evacuating line 31. Since this line runs alongside the cooling element 36 and is in direct contact, the evacuating line will have approximately the same temperature as the cooling element 36 (approximately 10° C.), and thus acts as a condenser for the oil that is carried. The separated oil flows along the inner wall of the evacuating line 31 into the expanded chamber 44 from which it proceeds across the collecting chamber 53 and the filter element 38 into oil sump.

We claim:

1. Blower apparatus comprising
   a rotor having a rotor shaft which is vertically disposed in operation,
   a motor housing disposed below said rotor, said housing having an interior and a pair of shaft bearings which receive said rotor shaft therethrough,
   a motor on said shaft in said interior of said housing,
   an oil sump below said housing,
   an evacuating line for connecting a vacuum pump to the interior of said housing, and
   a drain line directly connecting said evacuating line to said pump, said sump lying below said evacuating line, said drain line having capillary action filter means therein.

2. Apparatus as in claim 1 wherein said drain line is connected to the lowest point of said evacuating line.

3. Apparatus as in claim 1 wherein said drain line 15 is configured as a vertical bore in said housing.

4. Apparatus as in claim 1 wherein said evacuating line has an enlarged cross section where said drain line is connected thereto.

5. Apparatus as in claim 1 wherein said evacuating line comprises an inlet segment connected to the interior of said housing, a vertically extending center segment, and an outlet segment below said center segment for connecting said vacuum pump, said drain line being connected to said outlet segment.

6. Apparatus as in claim 1 wherein said housing is a casting, said evacuating line comprising a stainless steel tube which is incorporated in the casting.

7. Apparatus as in claim 1 further comprising cooling means for said housing.

8. Apparatus as in claim 6 further comprising a tubular cooling coil which is incorporated in said casting in contact with said evacuating line.

9. Apparatus as in claim 1 wherein said drain line comprises a collecting chamber above said filter means.

10. Apparatus as in claim 1 wherein said filter means comprises a sleeve and a filter element, said apparatus further comprising a mounting flange for retaining said sleeve in said drain line.

11. Apparatus as in claim 1 wherein said filter means comprises a polyethylene filter element.

12. Apparatus as in claim 1 wherein said filter means comprises an element with a tapered end.

13. Apparatus as in claim 1 wherein said filter means comprises an element which extends into said sump.

* * * * *

UNITED STATES PATENT AND TRADEMARK OFFICE
CERTIFICATE OF CORRECTION

PATENT NO. : 5,114,320

DATED : May 19, 1992

INVENTOR(S) : Kabelitz et al.

It is certified that error appears in the above-identified patent and that said Letters Patent is hereby corrected as shown below:

Column 1, line 11, after "rotor" delete "and".

Column 2, line 51, delete "blower I" and insert --blower 1--.

Column 4, line 14 (claim 3), after "line" delete "15".

Signed and Sealed this

Twenty-sixth Day of October, 1993

Attest:

BRUCE LEHMAN

*Attesting Officer*     *Commissioner of Patents and Trademarks*